E. H. CURTIS, Jr.
GLASSWARE MACHINE.
APPLICATION FILED DEC. 24, 1917.

1,386,240.

Patented Aug. 2, 1921.
5 SHEETS—SHEET 5.

UNITED STATES PATENT OFFICE.

EDMA H. CURTIS, JR., OF NORWOOD, OHIO.

GLASSWARE-MACHINE.

1,386,240.  Specification of Letters Patent.  Patented Aug. 2, 1921.

Application filed December 24, 1917. Serial No. 208,589.

*To all whom it may concern:*

Be it known that I, EDMA H. CURTIS, Jr., a citizen of the United States, and a resident of Norwood, in the county of Hamilton and State of Ohio, have invented certain new and useful Improvements in Glassware-Machines, of which the following is a full, clear, and exact description, reference being made to the accompanying drawings, forming part of this specification.

My invention relates to leers and conveyers for use in making glassware, wherein the conveyer carries the ware from the molding machine, deposits it in the leer automatically and carries it through the leer if desired.

The device within the leer comprises essentially a series of fixed bars and a series of interlying movable bars which have four movements, to wit:—a forward movement and an upward movement which bring them up between the fixed bars to a level above said bars; a rearward movement, while elevated, and a downward movement which carries them back below the fixed bars.

In combination with the said leer arrangement, there is also a conveyer, automatically operated, which comprises carrier members having fixed bars to lie in line with the fixed bars of the leer, and a stop or centering device which lines up the bars of the conveyer with the bars of the leer, so that the forward movement of the movable bars of the leer will enter between the bars of the conveyer and lift off the glassware.

The leer in such an arrangement need not be close up to the molding machinery, since the conveyer from the molding machine does not retain the glassware as it passes through the leer. If the leer in use by any manufacturer is equipped with a moving belt for carrying the bottles slowly along in the presence of the annealing heat, then the fixed and movable bars and the conveyer may be readily adapted for unloading the glassware onto the belt, within the leer.

The door giving admission to the glassware in my device need be large enough only to let through one article, plus the size of the small carrier member of the conveyer, since the articles are sent into the leer in a line and taken off the conveyer sidewise in a body, by the movable bars.

The length of movement of the movable bars is only that which is sufficient to move the width of one article, so that the leer is packed closely with glassware the entire time. I am aware that in plate glass leers, where large sheets of glass are to be moved along, a fixed and movable bar device is provided, but so far as I am informed, the movement of the bars is not a fixed and automatic one as in my new device, but is controlled by an operator and has a large dimension of movement.

I do not understand, however, that a fixed and movable bar device has ever been used as a means for picking up articles and carrying them into a leer, nor am I aware of any instance in which a conveyer, automatic or not, is provided, to coöperate with a series of movable bars for this purpose.

Aside from the above new principles, as I am now familiar with the art, it is my object to provide a strong and efficient mode of operation of the various elements of the invention, and I consider these modes of operation as important in view of the very great weight which must be borne by the device when it is filled with glassware.

I have found from experience with the machine that the fixed and movable bar method of moving hollow glassware results in far less breakage than any other method of carrying glassware through a leer with which I am familiar, and therefore believe that my invention extends so far as to cover this method of moving glassware, in which the center of gravity is high as compared to a sheet of plate glass, and in which the supporting surface is small in comparison with the bulk of the article.

The above noted objects and advantages I accomplish by that certain construction and arrangement of parts to be hereinafter more specifically pointed out and claimed.

In the drawings,

Fig. 5 is a detail section on a larger scale, taken through a modification of the device, wherein it is adapted to merely unload the bottles from a conveyer and feed them onto a continuous belt or the like.

Fig. 6 is a plan view on the scale of Fig. 5, showing the detail of the bars and conveyer.

The leer as shown, being merely taken as any desired form of leer, has side walls 1, 1, and an arch 2. To the front of the leer is a burner chamber 3, which is cut off from the rest of the leer, and the products of combustion pass into the leer between the main arch and a lower arch 4. The burner chamber has an inner wall 5, and the wall 5 and the arch 4 partially cut off the space within the leer in which the conveyer enters, and the glassware is unloaded.

The leer walls are cut away at 6 for the entrance of the conveyer members loaded with the glassware, and at 7 for the operating parts of the conveyer, and to permit the return through the leer of the conveyer trains by means of an endless chain mode of operation which will be briefly noted below. Preferably located in the openings of the side walls are the centering devices for the conveyer trains which are also described below, in their prefererd form.

In the one form of the device, where no belt is provided for carrying the glassware through the leer, a complete floor is formed clear across the leer, and the full length thereof, out of a series of interspaced fixed bars 8, higher side bars 8$^a$, and movable bars or transfer bars 9. As will be explained, the conveyer cars, coupled together to make up a flexible carrier adapted to return for reloading on an endless double track, have fixed bars for the glassware supporting surface which when properly brought into the leer and centered will lie in exact line with the fixed bars of the leer, so that the movable bars thereof can be thrust forward between the bars of the conveyer members, raised and withdrawn with a load of bottles or whatever ware is upon the conveyer.

*The conveyer.*

The essential principle of my conveyer is shown in my pending application filed March 28, 1917, Serial No. 157,886, except for certain details of structure which will be noted. It comprises a series of cars 10, each having lugs 11, spaced apart so that the forward lugs of each car fit between the rearward lugs of the car in front of it. Journaled on pintles held in the lugs are rollers 12. There is provided an upper and lower track for the rollers on each side of the cars, and this track 13 is an endless one having return bends 13$^a$ at the extremes of the path of the conveyer elements of cars. One of these return curves is shown as located in the opening 7 of the leer walls, although this is merely a preferential matter.

The conveyer trains are preferably operated by a puller car 14, which has depending lugs 11 like the other cars have, and also have a centrally depending slidable post 15. The post 15 is positioned to contactually engage a laterally extending pin on a chain 15$^a$, there being as many of these pins as desired.

When it is desired to stop the train, a device is provided to lift up the slidable post 15, thereby bringing it out of engagement with the extending pin on the chain. This is done by coupling the post across the face of the puller car with a rigid link or bar 16. The link 16 is connected to a second sliding post 17 which is journaled in the side of the puller car at 18. The post 17 has a roller 19 at its lower end which is pushed upwardly by any desired incline plate 20.

It can be seen that the position of the plates 20 in the conveyer will regulate the point at which the trains come to a stop. Reference is made to my application above identified for a description of the mode of operation of the conveyer and trains, other than as detailed above.

The cars, except the puller, where used, have formed on their upper surfaces a series of bars 21, which, as above stated, correspond in spacing to the fixed bars of the leer. As has been noted, a centering device is provided to coöperate with the lifting or incline plate 20 within the leer, to bring the bars of the cars into exact registry with the bars of the leer. This device is operated from the member that raises and lowers the movable bars of the leer, so that the device can be timed to bring in a conveyer train when the movable bars have been retracted and center the train at the moment of lowering the movable bars with a load of glassware thereon.

Leaving until later the description of the devices for providing this last mentioned movement, it will suffice here to state that a rod 22 is connected to a crank 22$^a$ on the end of the lifter operating shaft. This rod extends forwardly of the leer and alongside of it, and is connected at its end with a modified bell crank 23, pivoted at 24 on the conveyer frame. Mounted on a suitable bracket inside of the leer is a centering lever 25 which is coupled by means of a rod 26 with the said bell crank. When the movable bar device is rocked, the bell crank will be pulled rearwardly by the rod and will in turn pull over the centering lever 25 so that it will swing into the path of the conveyer train and contact with the rear car thereof. This will push the train into a given position.

The centering lever at the entrance of the device, as shown at 25, is preferably mounted on a vertical shaft 27. The bell crank is connected by means of a rod 29 with a like centering device at the exit of the conveyer from the leer. This device comprises a centering lever 30 mounted on a vertical pin 31 and has a crank 32 which is connected to the rod 29 from the first centering member. Thus when the first device is operated, the motion will serve to swing inwardly the other lever at 30, so as to bring it into the path of the conveyer train.

Since the centering devices now described are connected up to the movable bar raising and lowering device, when the movable bars are up, the levers will be moved out of the way by a reverse movement to the one above described, and the train will be held in place while the movable bars are down, which is their position when they are thrust forwardly, by another mechanism to enter between the bars of the conveyer train.

The fixed bars.

It will be understood that the fixed bars are spaced clear across the "bed" of the leer and they extend the full length of the leer from the receiving station to the delivery station, unless the device is employed merely for unloading onto a belt or other conveyer.

Supporting columns 50, 50, are provided at each side of the leer and heavy channel bars 51 placed across the machine between each pair of posts. On suitable heavy brackets 52, mounted on the channel bars at proper intervals, are mounted I-beams 53. These beams support the fixed bars, which have depending plates 54 on them that seat in grooves 55 in the I-beams.

The details of this mounting means is not of great importance and it is not considered that greater detail in the explanation is requisite. No action takes place on the fixed bars, and they are spaced sufficiently to carry a piece of glassware that is set down upon them by the movable bars.

The movable bars.

Preferably opposite the brackets for the fixed bar supports are brackets 56, located on the end of the channel bar 51. In these brackets are journaled rock shafts 57, which extend out through the walls of the leer, and are rocked from without as will be described.

Fixed on the shafts and located adjacent the brackets, by preference, are levers 58, which journal on their outer edges a roller 59, one for each set of levers. Extending in the other direction on the levers are arms 60 which have counterbalancing weights 61 on their outer ends, to take up the excessive strain placed on the rock shafts during their operation.

The movable bars, which, as has been noted, are set, one between each fixed bar, have depending plates 62 thereon which rest on the rollers 59.

Figure 1:
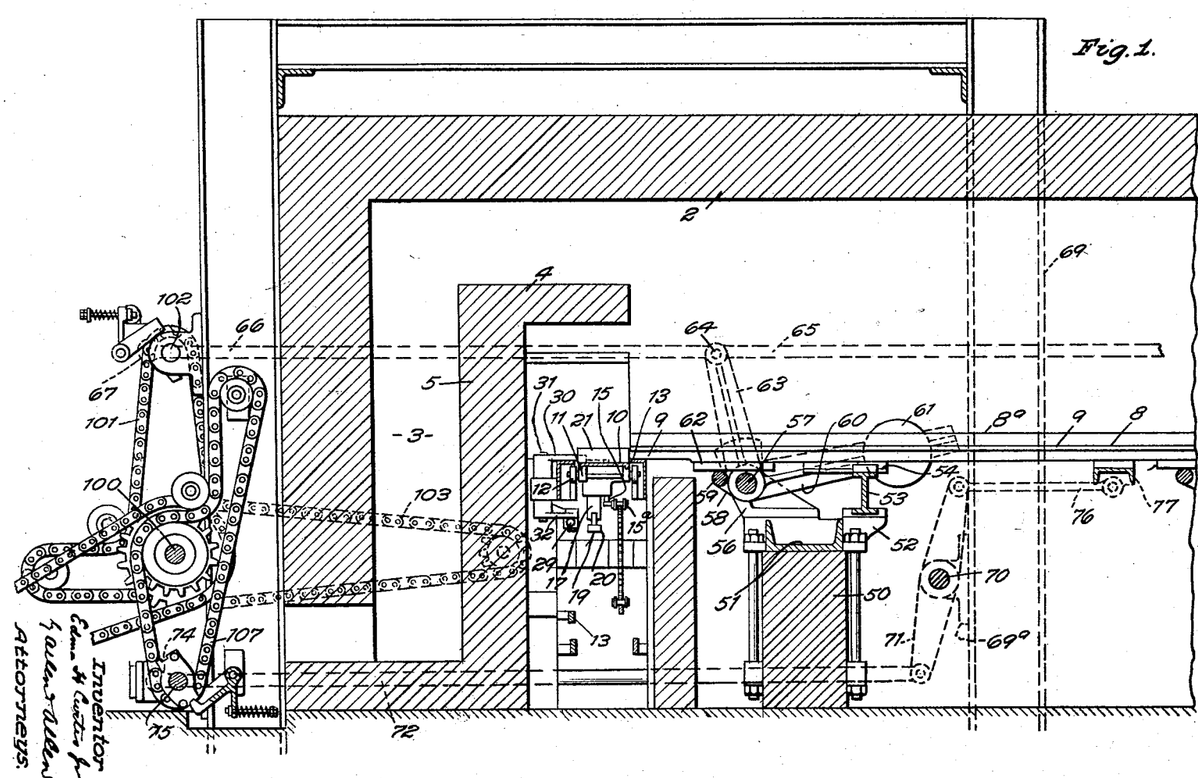
Figure 1 is a longitudinal section, taken through the leer, on the line 2—2 of Fig. 2.
Figure 2:
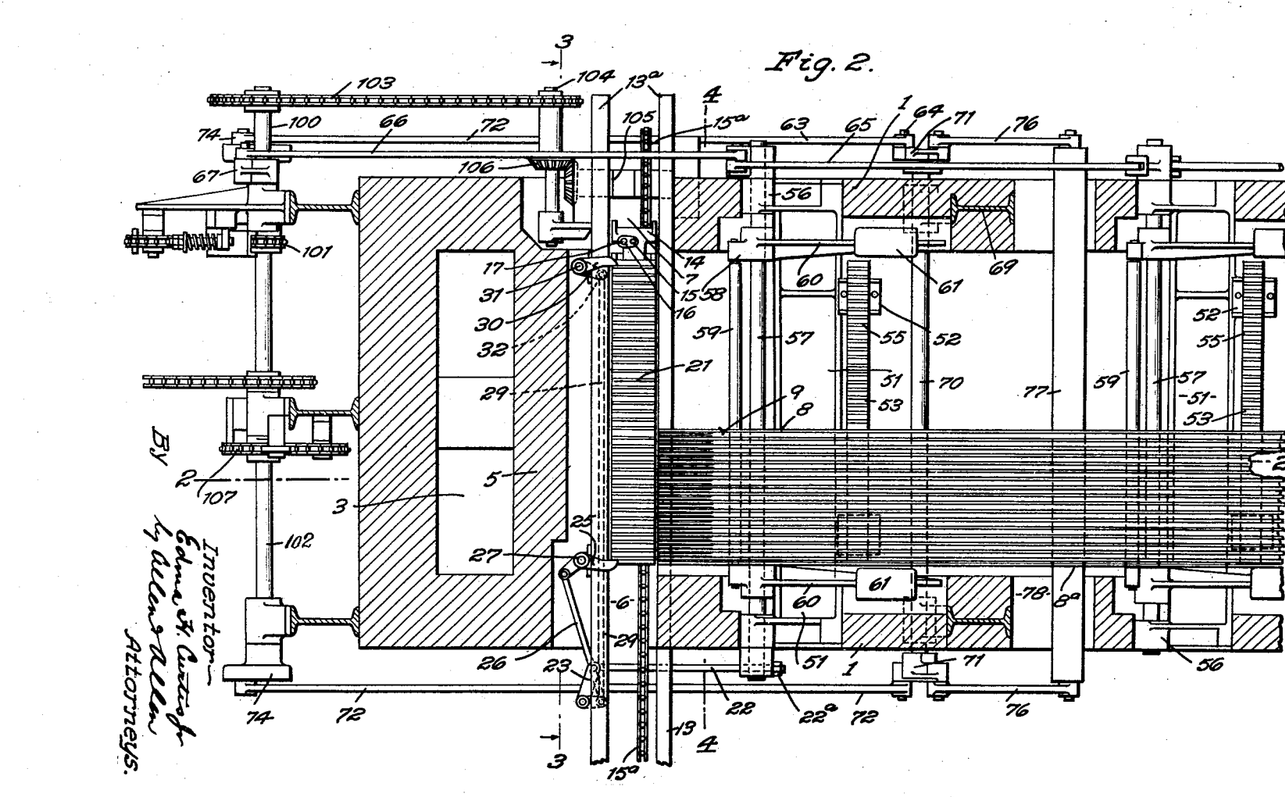
Fig. 2 is a plan view of the carrying device within the leer, with most of the fixed and movable bars of the carrying device omitted.
Figure 3:
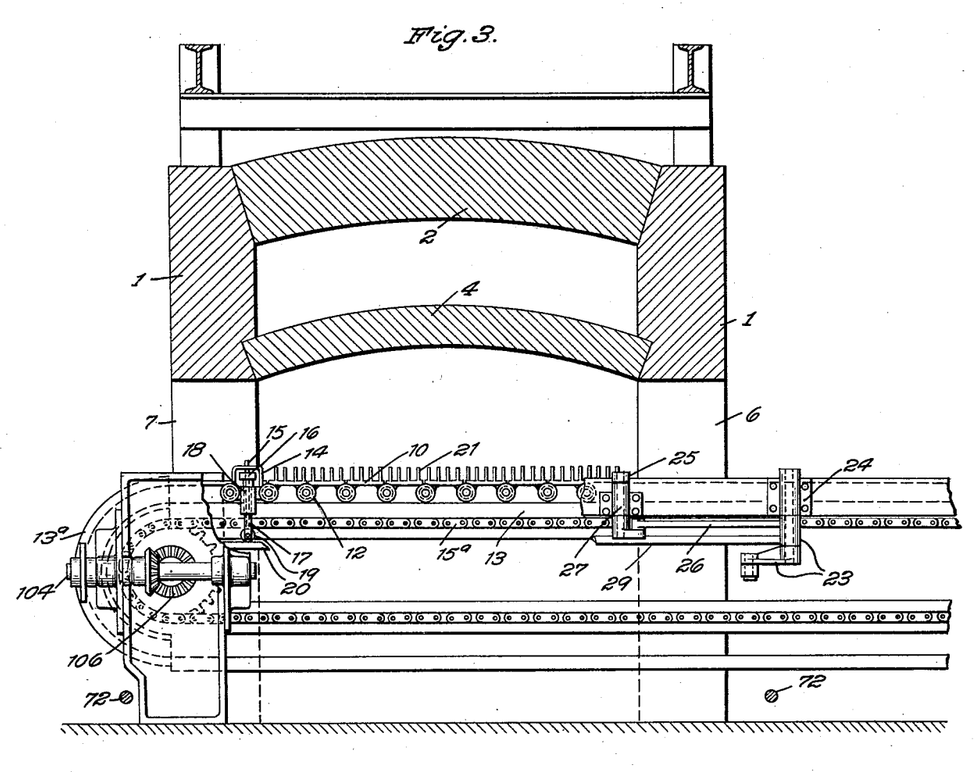
Fig. 3 is a section taken on the line 3—3 of Fig. 2.
Figure 4:
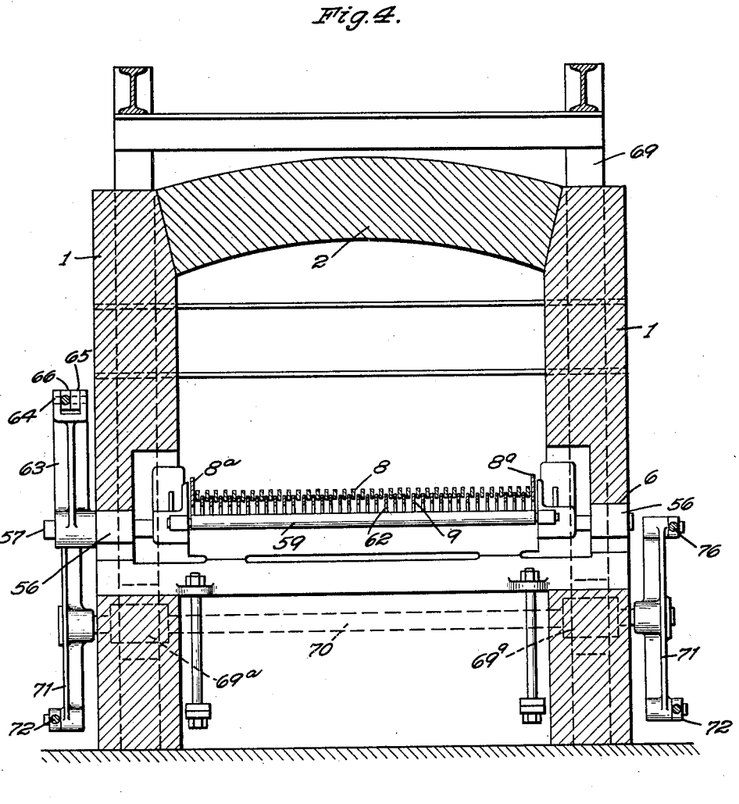
Fig. 4 is a like section taken on the line 4—4 of Fig. 2.

On the end of each rock shaft is fixedly mounted a crank or arm 63 (Fig. 2, left hand side), which has a pivot pin 64 which serves as a driving pin, and a rod 65 which serves as a connection for driving the next adjacent rock shaft.

Connected to the pivot 64 of the first crank is a rod 66, which is driven from a crank 67 at the front of the machine, and running from the rod 66 of the first crank is a rod 65 which extends to the pin 64 on the next crank. This interconnection extends the length of the machine for as many of the rock shafts as are necessary to run the machine.

The crank 67 is operated at the given time, and rocks the first shaft, which rocks all the rest simultaneously, and a motion is given to the members which causes a raising of the rollers 59. This raises the movable bars. As will be noted, the operating device then remains in position with all the bars lifted until the time comes for them to be lowered, when the operation is reversed, by the completion of their revolution by the various cranks.

The bars can be moved forwardly or rearwardly while either raised or lowered, since the rollers 59 are arranged to revolve as easily as possible under the weight.

For moving the bars lengthwise of the machine another set of devices is provided. These devices comprise heavy vertical standards 69, inside of the leer, on which is journaled by means of journals 69$^a$ a rock shaft 70. On each side of the machine, on the outside thereof, there are mounted the centrally pivoted levers 71.

From each lever, at the lower end preferably, extend the operating bars 72, which are connected to alined cranks 74 on the shaft 75 of the operating device, at the front of the machine. From the upper end of the levers extend rods 76 which are pivotally connected to a cross bar 77.

This cross bar is mounted on these rods 76 and extends across the interior of the machine, and out through the walls thereof at each end, the walls being cut away at 78 to give sufficient clearance for its movement.

The movable bars are each connected in some suitable manner to the cross bar 77, and when the lever is rocked by the actuating mechanism of the machine, the cross bar 77 will be moved forwardly or rearwardly of the machine by a divided movement of the forward cranks, as in the case of the rock shafts for raising the bars.

There need be but one of the devices for moving the bars forwardly or rearwardly, as the cross bar 77 of this mechanism does not have to bear the weight of the bars or the very great weight of the glassware on the bars when the leer is full.

As an unloading device.

Figures 5, 6:
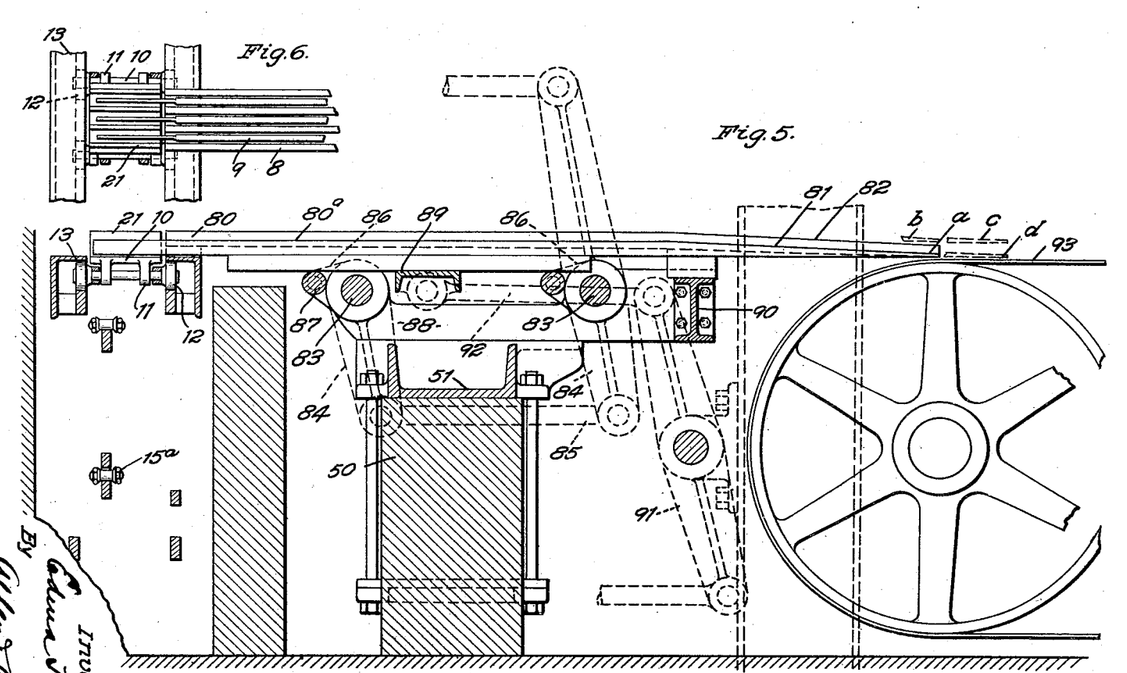

As shown in Fig. 5, the same principles and approximately the same mechanism may be employed for operating the device as an unloader. The fixed bars 80 of the unloader correspond to the fixed bars above described, and the movable bars 80ª correspond also. The ends of the movable bars at the unloading end of the devices are preferably made the same also, although this feature is shown only in connection with the conveyer unloader.

Each movable bar tapers down at 81 at its unloading end, and it can be seen that the row of glass articles lifted up by the movable bars at the termination of the fixed bars will be carried out over a carrying platform or belt, and that when the bars return in the operation of the machine, that the glass articles will be pushed off of the movable bars by contact with the ends of the fixed bars, which are tapered down also, as at 82. Also it can be seen, that when the movable bars again advance with a load at their tapered ends, that they will push the row of bottles just deposited forward, if the receiving or unloading member is not movable as in a belt. The four positions of the movable bars are shown in dotted lines at $a$, $b$, $c$ and $d$.

Where there is no belt, a packer stands at the unloading end of the machine and packs the glassware in boxes, lifting the bottles off the bars which extend out at the rear of the leer.

For raising the movable bars in the unloader device of Fig. 5, there are two rock shafts 83, connected together by cranks 84 and links 85 so as to operate jointly. Each rock shaft has levers 86 which support rollers 87, as in the large device.

The brackets 88 which mount both shafts are depressed at the middle to give clearance to the shifting cross bar 89 that moves the movable bars forward and back, and an extension from this same bracket serves, as at 90, to provide the rear support for the fixed bars, which at their forward ends rest on the sides of the conveyer structure (as is the case in the large device).

The operation of the cross bar 89 is by means of a like lever 91 and a link or rod 92, as in the instance first taken up.

The movable bars unload upon any desired conveyer belt 93 which retains the glassware in its passage through the leer. The showing of the conveyer is merely diagrammatic, and not intended to illustrate any particular sort of conveying device.

Operating and timing devices.

The conveyer and the movable parts of the leer are all operated by the same source of power off a main shaft 100. A series of chains run from sprockets on this shaft over specially devised pulleys. The pulleys and chains providing means for intermittently giving a half revolution to the special pulleys, are described in detail in my application for patent filed March 6, 1917, Serial No. 152,462.

A chain 101 runs from the main shaft to the pulley on the shaft 102 on which is the crank 67 for the movable bar raising devices. A chain 103 runs from the main shaft to the conveyer operating shaft 104, from which movement is continuously given to the conveyer driving pulley shaft 105 by means of beveled gears 106.

A chain 107 runs to the shaft 75 which operates the cranks 74 of the movable bar shifting means.

It will be understood upon reference to my application above noted that from the continuously operating shaft 100, the various devices may be timed accurately to operate when desired, and to remain out of operation as long as desired (within reasonable limits).

The timing which I prefer is as follows:—

Every fifty seconds a train comes into the leer, and as the operating device for the train releases it at practically the correct stopping point, the bar device lowers the bars, taking five seconds to effectuate the lowering movements. As was noted, the lowering of the bars brings the centering device into play which alines the trains perfectly and holds the trains in alinement until the movable bars are raised.

As soon as the bars are lowered, they move forward into position with their ends between the bars on the cars of the train taking five seconds for the movement. The bars then raise, taking five seconds and are then drawn back, taking five seconds more, the movements being thus very slow, so as to not topple over any glassware.

When the bars have reached their rearward and upward position, the train is picked up in the conveyer and moved out and back to its starting point adjacent the bottle machine. The bars remain thus in upward position for thirty seconds until the next train is brought in and released.

This timing is merely the preferred one, and could easily be varied dependent upon the facilities for delivery of glassware to the conveyers.

Conclusion.

It is believed that the operation of the device has been sufficiently described in connection with the various members of the machine. It should be understood that the conveyer, timing and operating devices are taken from my two above referred to applications for Letters Patent, and that they are merely adopted for the purposes of illustration of my invention which has to do with the unloading of glassware automatically in leers and also partially to conveyers within leers.

While the fixed and movable bar device has been used for carring sheets of plate glass through leers, I am not aware that this mechanical expedient has ever been employed for moving other glass articles in small fixed steps, at a very slow speed, or for the delivery of glass articles to a packing platform or onto a belt or the like, particularly where the movements are automatic. For these reasons I believe that it is invention to apply to a seemingly top-heavy article, the bar device used in plate glass transportation, in the manner shown.

Having thus described my invention, what I claim as new and desire to secure by Letters Patent, is:

1. A carrier device in a leer, comprising a series of closely interspaced fixed and movable bars, and means automatically controlled for slowly moving the movable bars above and below the fixed bars, and forwardly and rearwardly of the leer, in short steps of a length adapted to clear one row of small articles from the next succeeding row whereby bottles and like glassware may be slowly and continuously moved through a leer.

2. In a leer, the combination with means for carrying glassware into the leer having fixed bars thereon, of fixed bars in the leer, movable bars between the fixed bars in the leer, and means for moving the movable bars into positions between the fixed bars of the carrying means, and then upwardly and back into the leer.

3. In a leer, the combination with means for carrying glassware into the leer having fixed bars thereon, of fixed bars in the leer, movable bars between the fixed bars in the leer, and means for moving the movable bars into positions between the fixed bars of the carrying means, and then upwardly and back into the leer, said leer having means for centering the carrying means to bring the bars thereof into alinement with the fixed bars of the leer.

4. In a leer, the combination with means for carrying glassware into the leer having fixed bars thereon, of fixed bars in the leer, movable bars between the fixed bars in the leer, and means for moving the movable bars into positions between the fixed bars of the carrying means, and then upwardly and back into the leer, said leer having means for centering the carrying means to bring the bars thereof into alinement with the fixed bars of the leer, said centering means being operated from the movable bar operating means.

5. A carrier device in a leer, comprising a series of closely interspaced fixed and movable bars, and means automatically controlled for slowly moving the movable bars above and below the fixed bars, and forwardly and rearwardly of the leer, in short steps of a length adapted to clear one row of small articles from the next succeeding row, said movable bars tapered at their ends to effectuate a delivery of the material in the leer whereby bottles and like glassware may be slowly and continuously moved through a leer.

6. In a leer, the combination with interspaced fixed and movable supports for glassware in the leer, and a conveyer member having fixed supports corresponding to the fixed supports of the leer, of a driving member common to the movable supports and the conveyer, and adapted to move the movable supports to unload the conveyer member and to move the conveyer member into and out of the leer.

7. In a leer, the combination with interspaced fixed and movable supports for glassware in the leer, and a conveyer member having fixed supports corresponding to the fixed supports of the leer, of a driving member common to the movable supports and the conveyer, and adapted to move the movable supports to unload the conveyer member and to move the conveyer member into and out of the leer, said driving member timed to thrust forward the movable supports after the conveyer member is in place in the leer, then lift the supports, then withdraw the supports, and then move the conveyer member out of the leer.

8. A carrier device in a leer, comprising the combination with a driving means, of a series of movable bars in the leer, rollers supported across the leer, said movable bars seated on the rollers, a cross bar across the leer, said movable bars connected to the cross bar, and means connecting the driving means with the rollers and the cross bar to raise and lower the rollers, and move forwardly and rearwardly the cross bar, said leer having fixed bars between which the movable bars are located, and said driving member connected to the rollers and the cross bar so as to give a short definitely limited up and down movement and a short forward and back movement to the movable bars.

9. A carrier device in a leer, comprising a series of closely interspaced fixed and movable bars, and means automatically controlled for slowly moving the movable bars above and below the fixed bars, and forwardly and rearwardly of the leer, in short steps, and comprising in part cranks connected to the bar controlling means, and driven shafts having cranks thereon connected to the cranks first mentioned, said driven shafts being provided with means for giving them intermittently a movement of one half turn thereby providing a definitely limited cycle of operations, said movement having a length adapted to clear one row of small articles from the next succeeding row.

10. The combination with the carrier structure in a leer, of a conveyer adapted to bring articles of glassware into the leer at definite intervals of time, and timed movable transfer bars forming part of the carrier structure adapted to lift glassware from the conveyer by raising up against the bases of the glassware and moving away from said conveyer, said conveyer having spaces thereon to permit the movement of transfer bars.

11. A leer having a forward burner chamber, and an arch extending rearward from the chamber walls to provide an overhead passage from the burner chamber into the leer, a conveyer in the leer, and located beneath said arch, and means within the leer for automatically raising the glassware from the conveyer.

EDMA H. CURTIS, Jr.